United States Patent
Bazarjani et al.

(10) Patent No.: US 7,406,339 B2
(45) Date of Patent: Jul. 29, 2008

(54) ON-CHIP DETECTION CIRCUIT OFF-CHIP MECHANICAL SWITCH'S OPEN AND CLOSE ACTIONS

(75) Inventors: Seyfollah Bazarjani, San Diego, CA (US); Sean Wang, San Diego, CA (US); Vincenzo Peluso, San Diego, CA (US); Louis Dominic Oliveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 10/213,000

(22) Filed: Aug. 5, 2002

(65) Prior Publication Data

US 2004/0023688 A1    Feb. 5, 2004

(51) Int. Cl.
*H04M 1/00* (2006.01)
*H04B 1/38* (2006.01)
*H02M 11/00* (2006.01)
*H03F 3/45* (2006.01)
*G06G 7/28* (2006.01)

(52) U.S. Cl. .............. 455/569.1; 455/90.1; 455/90.2; 455/351; 327/103; 327/334

(58) Field of Classification Search .............. 455/569.1, 455/575.2, 90.1, 90.2, 90.3, 351, 550.1; 700/94; 327/103, 334
See application file for complete search history.

(56) References Cited

U.S. PATENT DOCUMENTS

| | | | | |
|---|---|---|---|---|
| 5,014,340 A * | 5/1991 | Wren | ........................ | 455/1 |
| 5,289,191 A * | 2/1994 | Elms | ........................ | 341/127 |
| 5,475,441 A * | 12/1995 | Parulski et al. | ........................ | 348/552 |
| 5,550,580 A * | 8/1996 | Zhou | ........................ | 348/14.1 |
| 5,870,031 A * | 2/1999 | Kaiser et al. | ........................ | 340/10.34 |
| 5,978,689 A * | 11/1999 | Tuoriniemi et al. | ........................ | 455/569.1 |
| 6,069,960 A * | 5/2000 | Mizukami et al. | ........................ | 381/74 |
| 6,195,570 B1 * | 2/2001 | Ishida | ........................ | 455/566 |
| 6,243,532 B1 * | 6/2001 | Wacker et al. | ........................ | 388/811 |
| 6,377,820 B1 * | 4/2002 | Courtis et al. | ........................ | 455/563 |
| 6,397,087 B1 * | 5/2002 | Kim et al. | ........................ | 455/569.1 |
| 6,591,114 B1 * | 7/2003 | Inbody | ........................ | 379/156 |
| 6,593,820 B2 * | 7/2003 | Eatock | ........................ | 331/57 |
| 6,615,059 B1 * | 9/2003 | Pehrsson et al. | ........................ | 455/569.1 |
| 6,674,382 B1 * | 1/2004 | Jordan | ........................ | 341/144 |
| 6,970,752 B1 * | 11/2005 | Lim et al. | ........................ | 700/94 |
| 2002/0037746 A1 * | 3/2002 | Osano | ........................ | 455/557 |

* cited by examiner

*Primary Examiner*—George Eng
*Assistant Examiner*—Un Cho
(74) *Attorney, Agent, or Firm*—George C. Pappas; Jonathan T. Velasco; Thomas R. Rouse

(57) ABSTRACT

An on-chip detection circuit automatically detects when an external switch has been activated. When the device is initialized, the detection circuit measures the operating current and coverts the information into an analog voltage. The analog voltage is then processed through an on-chip analog-to-digital converter and the digitized result is stored as a reference value. To sense the open and close action of the off-chip mechanical switch, the device then takes a sample of the operating current periodically, digitizes this information and compares the sampled value to the reference value. A change in value larger than some predetermined level indicates the external switch has been activated.

21 Claims, 3 Drawing Sheets

ON-CHIP DETECTION CIRCUIT OFF-CHIP MECHANICAL SWITCH'S OPEN AND CLOSE ACTIONS

FIELD

The present application relates to on-chip detection circuits, and more particularly to providing an on-chip detection circuit to detect the action of an off-chip switch.

BACKGROUND

In wireless communication systems, a mobile station may be comprised of a handset including a microphone and speaker which are used to receive and place calls. Handsets typically require the user to hold the handset close to the user's head so the microphone and speaker are positioned close to the user's mouth and ear, respectively. However, there are times in which the user may desire to use the handset in a handsfree mode, such as when walking or using the handset for an extended period of time. In these circumstances, a headset may be used which connects to the handset and allows the user to operate the handset in a handsfree mode. Additionally, the headset allows the user to operate in a handsfree mode while maintaining privacy between the user and the handset. In addition to a mobile station, other portable devices such as personal digital assistants (PDA), portable music players and similar devices may take advantage of the use of a headset.

Wireless communication systems typically comprise a plurality of base stations and mobile stations that communicate using an over-the-air communication protocol using physical layer technologies such as Code Division Multiple Access (CDMA) technology. As more functionality is added to wireless handsets and other devices, it may be desirable to include a control switch with a headset to allow a user to operate or activate features in the device from the headset. For example, a user could close the control switch to activate a mute function, control playback of an audio file, launch a web browser, or dial a number. Of course, the control switch may activate any number of features, and is not limited to the features listed here.

For the control switch to be functional, a detection circuit may be used. Detection circuits are designed to effectively sense a change in operating current triggered by the opening and closing action of the switch on the headset. Currently detection is done off-chip, requiring extra off-chip components, which increases the cost and complexity of the portable device. Alternatively, a current-to-voltage conversion may be performed and a sample-and-hold circuit may used to store the information. However, this technique performs all functions in the analog domain, and thus requires a high quality operational amplifier, comparator, and low leakage sample-and-hold capacitor. These devices are large and expensive, and thus not desirable. Because the activity time is at least once every 25 ms, it is difficult to design an accurate and power efficient sample-and-hold circuit for the application.

What is needed is a system that detects the open and close action of a mechanical switch and performs the functions in the digital domain. By determining the action of the mechanical switch in the digital domain, a more compact, accurate, and efficient design may be obtained. The system should also be capable of being incorporated on-chip to minimize the complexity and cost of the solution.

SUMMARY

An on-chip detection circuit automatically detects when an external switch has been activated. When a device is initialized, the detection circuit measures the operating current and coverts the information into an analog voltage. The analog voltage is then processed through an on-chip analog-to-digital converter and the digitized result is stored as a reference value. To sense the open and close action of the off-chip mechanical switch, the device then takes a sample of the operating current periodically, digitizes this information and compares the sampled value to the reference value. A change in value larger than some predetermined level indicates the external switch has been activated.

Another embodiment includes a device having a current monitor adapted to sense the current of an external circuit having a switch. The sensed current is converted to a digital value which is supplied to a comparator. The comparator compares the digital value to a reference value and determines the switch has been actuated if the digital value differs from the reference value by at least a predetermined amount.

These and other features and advantages of the embodiments will become more apparent upon reading the following detailed description and upon reference to the accompanying drawings.

DETAILED DESCRIPTION

Figure 1:
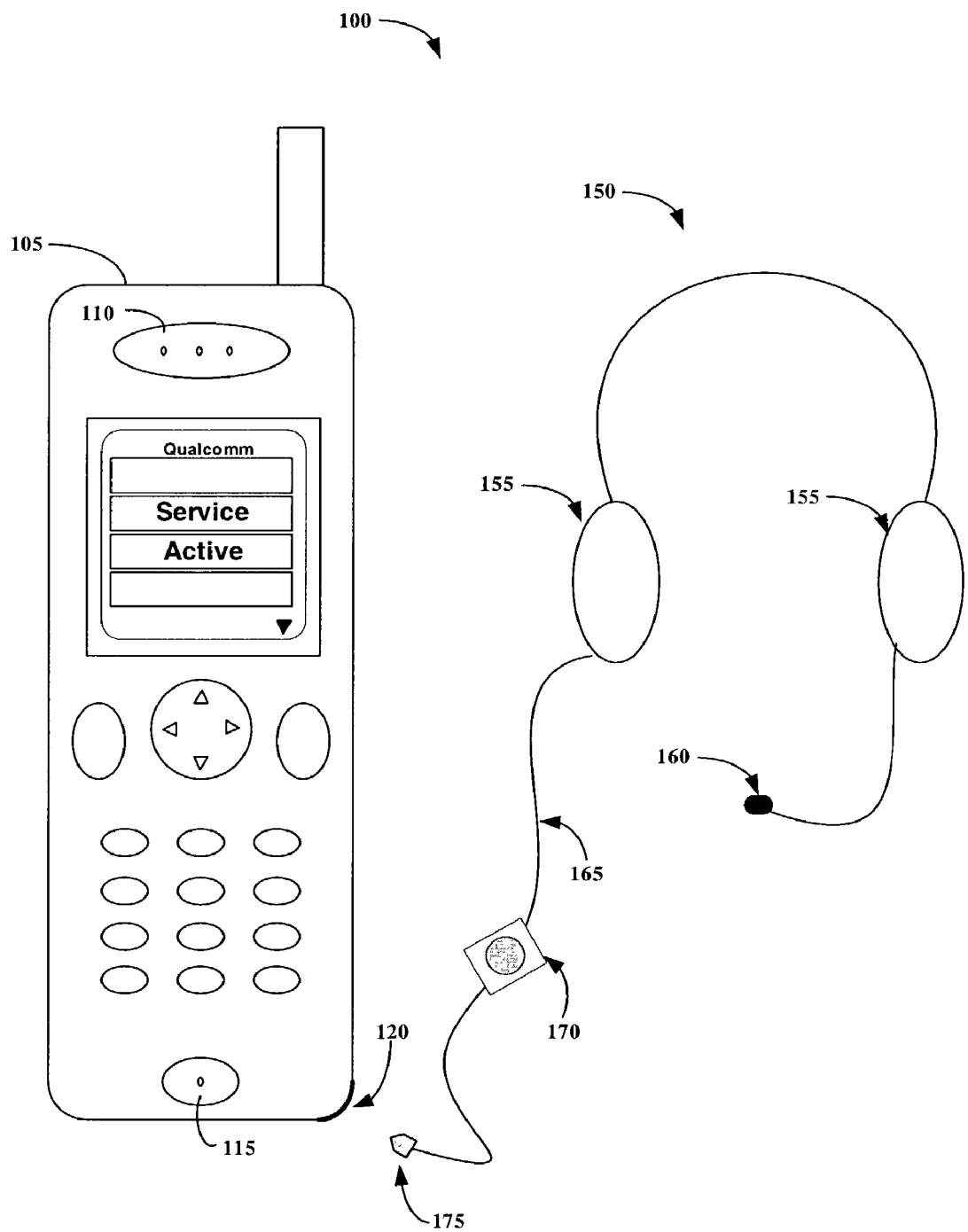
FIG. 1 illustrates components of a wireless communication system including a headset and a mobile station.

FIG. 1 illustrates components of an exemplary wireless communication system 100. The wireless communication system 100 includes a device such as a mobile station 105, or handset. The mobile station 105 is used in the wireless communication system 100 to communicate with a base station (not shown). This communication may use an over-the-air communication protocol using physical layer technologies such as Code Division Multiple Access (CDMA) technology. Although the present embodiment is shown with a mobile station 105, it can be appreciated that any device may be used that needs to detect the activation of an external switch. The mobile station 105 includes a speaker 110 which allows a user to hear sounds and a microphone 115 which detects the user's voice. Typically, the user holds the mobile station 105 to the user's head so that the speaker 110 is proximate the ear and the microphone 115 is proximate the mouth. The mobile station 105 may also include a port 120 designed to accept a plug 175 from an external headset 150.

The external headset 150 may be used in with an external device such as the mobile station 105. The external headset 150 includes an earpiece 155, a microphone 160, a connector cord 165, a switch 170, and the plug 175. The headset 150 may be used when the user desires to operate the device in a handsfree mode. To use the headset, the plug 175 is inserted in the port 120 of the mobile station 105. When the headset 150 is connected, the signals typically directed to the speaker 110 are sent to the earpiece 155, and the microphone 115 is disconnected while the microphone 160 is connected. Signals are transferred between the mobile station 105 and the headset 150 via the connector cord 165. The mobile station 105 may contain hardware, software, and/or firmware that detects the presence of the headset 150 and modifies any signals accordingly.

The headset 150 may contain an external switch 170 which may be manually activated by the user. Activation of the switch may invoke features in the device from the headset, such as a mute function, control playback of an audio file, launch a web browser, or dial a number. In order to invoke those features, the mobile station 105 needs to detect when the switch has been closed. The present embodiment includes a detection circuit which detects the action of the mechanical switch 170 and performs the detection functions in the digital domain. By determining the action of the mechanical switch 170 in the digital domain, a compact, accurate, and efficient design is obtained.

Figure 2:
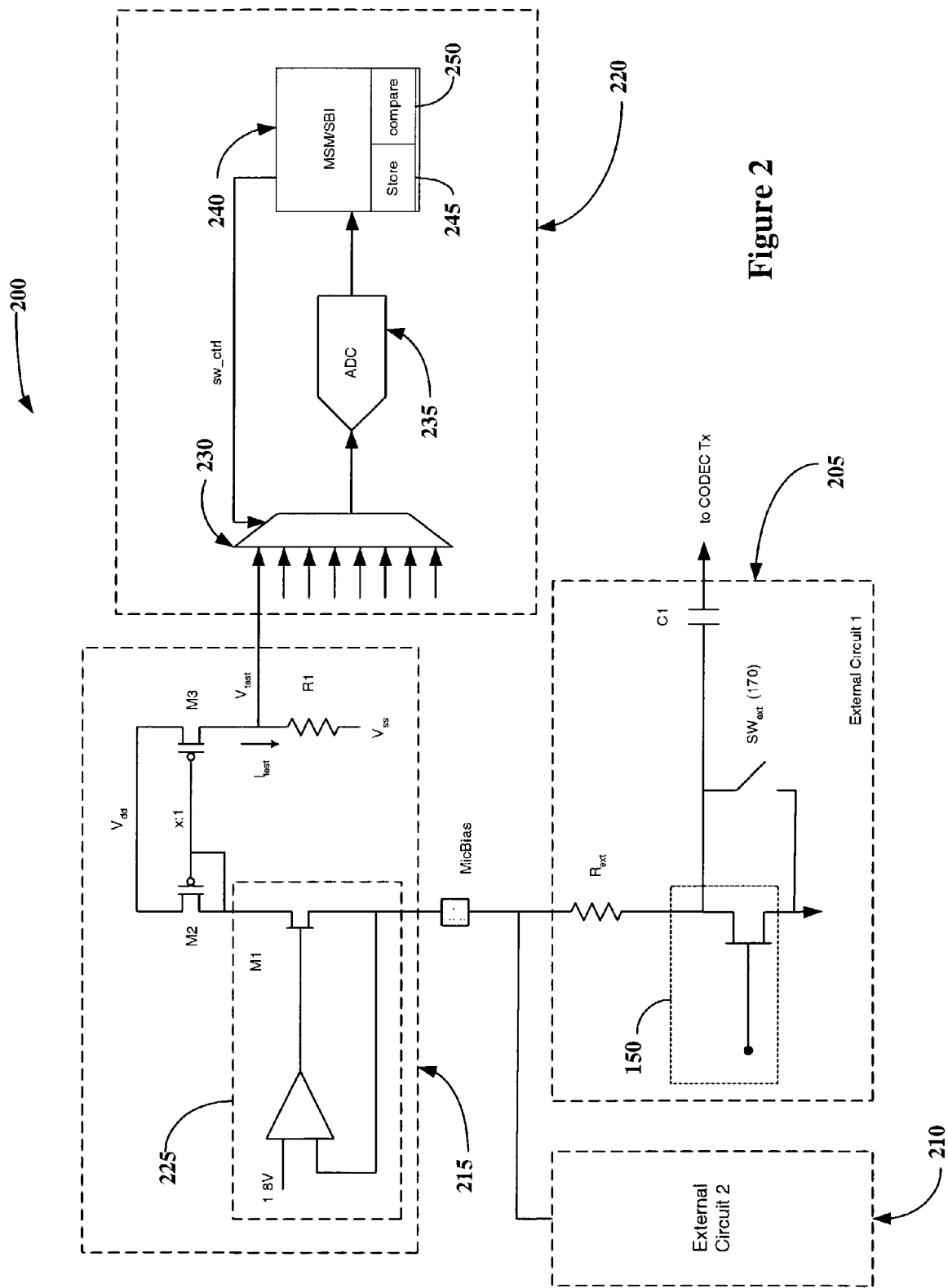
FIG. 2 is a circuit diagram of a detection circuit which may be used in a portable device.

FIG. 2 is a circuit diagram of a detection circuit 200 which may be used in a portable device. The detection circuit includes external circuits 205, 210, an analog portion 215, and a digital portion 220. The external circuits 205, 210 include one or more headsets 150 having external switches 170 which may connect to the mobile station 105. The detection circuit 200 may be used with a plurality of external circuits, however for purposes of the description, only a first external circuit 205 will be discussed. The external circuit 205 includes the headset 150 and the external switch 170 ($SW_{ext}$). The headset 150 and external switch 170 are connected to capacitor C1, and then to the CODEC. The external circuit 205 also includes an external resistor $R_{ext}$. The value of the external resistor $R_{ext}$ is selected by the manufacturer, and its value directly affects the magnitude of the current jump when the external switch 170 is closed. In one embodiment, the value of the external resistor $R_{ext}$ may range from 1.69 k$\Omega$ to 4 K$\Omega$.

The external circuit 205 is connected to the analog portion 215 of the detection circuit 200 through a pin called MicBias. A signal swing of approximately 229 mVpp may be expected on the AC coupled input node to the CODEC transmission path, and the current resulting from such a swing has to be treated as noise by the detection circuit 200, so that the detection circuit can reduce the chance of a false positive indication in the detection circuit 200.

The analog portion 215 of the detection circuit 200 includes a MicBias voltage generator 225, a current mirror consisting of transistors M2 and M3, and a resistor R1. The MicBias voltage generator 225 may be used to power the external circuit 205. Although a 1.8V input voltage is shown, it can be appreciated other voltage levels may be used. The transistor M2 in the current mirror may be of a wide-swing design to ensure the transistor M2 can handle a maximum current level even with a reduced on-chip analog power supply level. The current sensed by the transistor M2 is the current from the external circuit. As the external switch 170 is closed, the current from the external circuit increases, and this increase in current is mirrored to transistor M3. The current mirror consisting of transistors M2 and M3 should be accurate, but not one-to-one. This design reduces the current on transistor M3, thus saving power. The current from the transistor M3 flows through the resistor R1 to generate the test voltage $V_{test}$. The temperature and process variation of the on-chip resistor R1 should be considered while determining the voltage level for $V_{test}$. The voltage $V_{test}$ should be designed so that even in the worst condition, the current mirror transistor M3 remains in saturation.

The test voltage $V_{test}$ is supplied to the digital portion 220 of the detection circuit 200. The digital portion 220 of the detection circuit includes a multiplexer 230, an analog-to-digital converter (ADC) 235, and a mobile station modem 240 including a store section 245 and a compare section 250. The multiplexer 230 receives the test voltage $V_{test}$ and may selectively provide the test voltage $V_{test}$ to the ADC 235. In one embodiment, the multiplexer 230 has eight inputs, although any size multiplexer 230 may be used. The ADC 235 coverts the analog test voltage $V_{test}$ to a digital voltage value. The multiplexer 230 may include a switch (not shown) which controls the transfer of the digital value to the mobile station modem 240 for processing. The switch in the multiplexer 230 may be controlled by the mobile station modem 240, which may continuously trigger the switch through control line sw_ctrl at a periodic rate (e.g. every 25 ms). Triggering the switch periodically ensures the digital test value is continuously provided to the mobile station modem for comparison. The digital value may be transferred to the mobile station modem 240 serially using, for example, a serial bus interface. Alternatively, the digital value may be transferred to the mobile station modem 240 in parallel.

The mobile station modem 240 includes the store section 245 which contains the reference value. The compare section 250 is used to compare the digital value to the reference value. If the digital value exceeds the reference value, then the mobile station modem 240 determines the external switch 170 was activated causing a current jump. The mobile station modem 240 may then generate a signal indicating activation of the external switch 170. The mobile station modem 240 may be programmed so that the digital value should exceed the reference value by a predetermined amount before the switch activation is detected. This may reduce the risk of noise in the system causing a false indication of switch activation.

Figure 3:
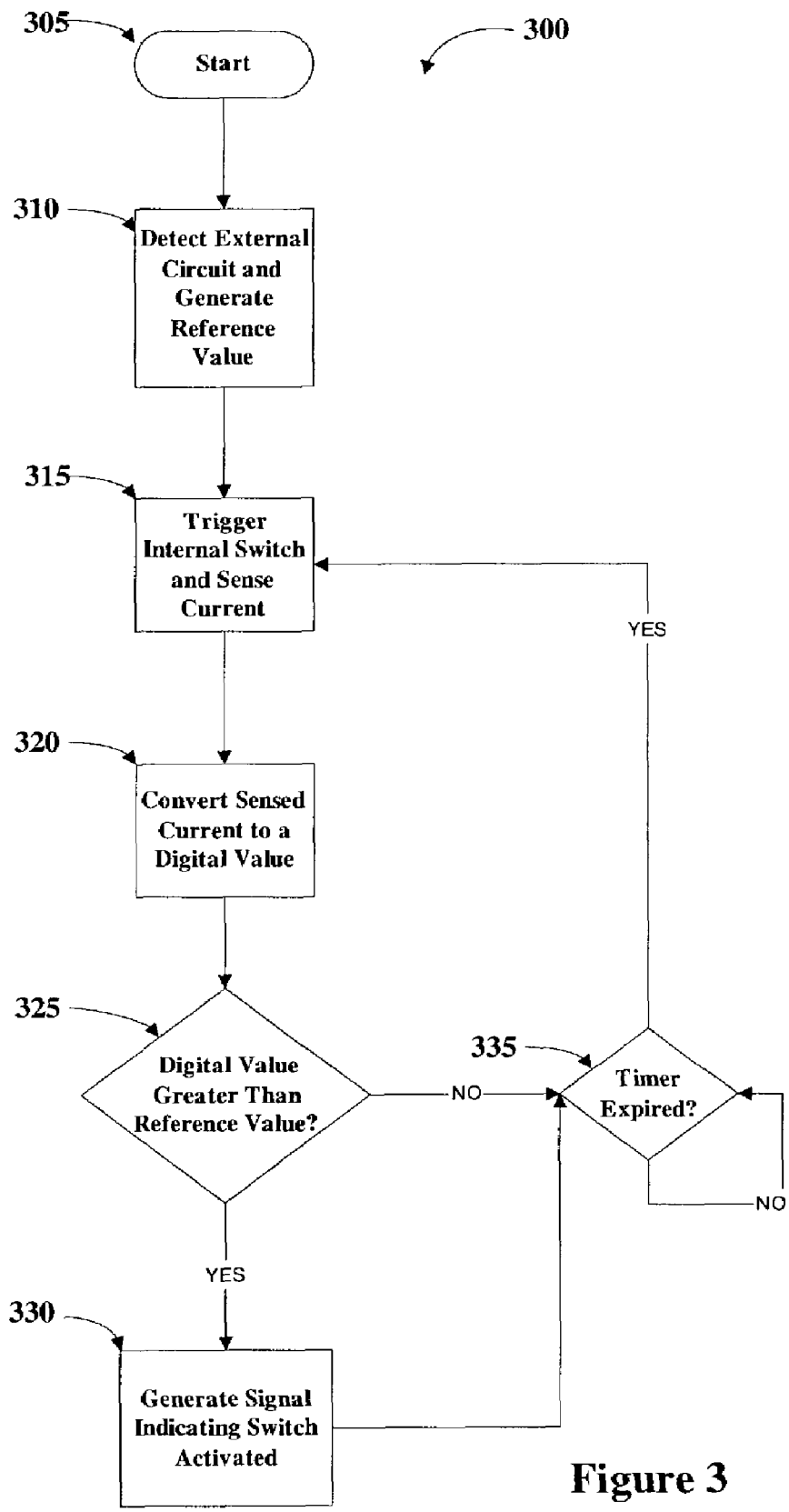
FIG. 3 illustrates a process for determining the open and close action of an off-chip switch.

FIG. 3 illustrates a process 300 for determining the open and close action of the off-chip switch 170. The process 300 begins in a START block 305. Proceeding to block 310, the process 300 detects the presence of external circuitry such as the headset 150 and generates a reference value. The reference value is generated once the external circuitry is detected with the switch 170 in the open position. The reference value is stored for later comparison.

Proceeding to block 315, the process 300 triggers an internal switch and senses the current from the external circuitry. The current may be from one external circuit or a plurality of external circuits. After the current is sensed, the process 300 proceeds to block 320, where the current is converted to a digital value. In one embodiment shown above in FIG. 2, the sensed current is mirrored to a test point. At the test point, the test voltage is determined and provided to an ADC where the test voltage is converted to a digital value.

Proceeding to block 325, the digital value is then compared to the reference voltage. If the digital voltage is the same as the reference voltage, the detection circuit concludes the switch has not been activated and proceeds along the NO branch to block 335. Returning to block 325, if the digital value is greater than the reference value, the detection circuit concludes the switch has been activated and proceeds along the YES branch to block 330. To ensure noise in the system does not inadvertently signal a switch activation, the digital value may need to exceed the reference value by a predetermined level before a switch activation is indicated.

In block 330, the activation circuit generates a signal indicating the switch 170 has been activated. This signal may be used by the mobile station 105 or other device as necessary.

Returning to block 335, after the digital value is compared to the reference value, the process 300 repeats the check at a periodic rate (such as every 25 ms). In one embodiment, this is accomplished by checking to see if the rate timer has expired. If the timer has not expired, the process 300 loops along the NO branch. Once the timer expires, the process 300 proceeds along the YES branch back to block 315 where the internal switch is again triggered to obtain a new current value. The process 300 continues to run as long as the headset 150 is connected to the mobile station 105.

Although the present device has been fully described in connection with the preferred embodiments thereof with reference to the accompanying drawings, it is to be noted that various changes and modifications will become apparent to those skilled in the art. Such changes and modifications are to be understood as being included within the scope of the present device as defined by the appended claims.

What is claimed is:

1. A device comprising:
    a voltage generator configured to maintain a constant supply voltage at a port of the device independently of a state of a switch of an external circuit connected to the port;
    a current monitor configured to sense, at the port, a current of the external circuit;
    a converter configured to convert the sensed current to a digital value; and
    a comparator configured to compare the digital value to a reference value and to determine the switch has been actuated if the digital value differs from the reference value by at least a predetermined amount.

2. The device of claim 1, wherein the reference value is measured and stored upon initialization of the device.

3. The device of claim 1, wherein the current monitor is further configured to sense the current of a plurality of external circuits.

4. The device of claim 1, wherein the voltage generator comprises:
    a supply transistor connected to a power supply; and
    a voltage comparator configured to minimize a voltage difference between transistor ports of the supply transistor to maintain a constant voltage over variations in current at the port of the device.

5. A wireless communication device comprising:
    an interface configured to connect the wireless communication device to an external circuit having a switch and to sense the current of the external circuit at periodic intervals at a port of the interface while maintaining a constant voltage at the external circuit independently of a state of the switch of the external circuit connected to the port;
    an analog-to-digital converter configured to convert the sensed current to a digital value; and
    a digital comparator configured to compare the digital value to a stored reference value and to determine the switch of the external circuit has been actuated when the digital value differs from the reference value by at least a predetermined amount.

6. The wireless communication device of claim 5, wherein the reference value is measured and stored upon initialization of the device.

7. The wireless communication device of claim 5, further comprising memory to store the reference value.

8. The wireless communication device of claim 5, wherein the interface includes a current mirror, wherein a transistor of said current mirror remains in saturation.

9. The wireless communication device of claim 8, wherein the current mirror is not one-to-one.

10. A method of determining activation of an external switch comprising:
    sensing a current at a node of an external circuit having a switch while maintaining a constant supply voltage at the node independently of a state of the switch of the external circuit connected to the node;
    generating a test voltage from the sensed current;
    converting the test voltage to a digital value;
    comparing the digital value to a reference value; and
    determining activation of the switch when the digital value differs from a reference value by at least a predetermined amount.

11. The method of claim 10, further comprising generating the reference value upon initialization.

12. The method of claim 10, further comprising detecting the external circuit is present.

13. The method of claim 10, further comprising sensing the current of the external circuit at a periodic rate.

14. The method of claim 10, further comprising sending a signal indicating the switch has been activated.

15. The method of claim 10, further comprising:
    minimizing a voltage difference between two transistor ports of a supply transistor to maintain the constant supply voltage.

16. A device comprising:
    a voltage generator configured to maintain a constant supply voltage to an external circuit having a switch;
    a current monitor configured to sense a current of the external circuit and including a current mirror configured to generate a test current;
    an analog-to-digital converter configured to detect a test voltage based on the test current and configured to convert the test voltage to a digital value; and
    a digital comparator configured to compare the digital value received from the analog to digital converter to a reference value and to determine the switch has been actuated if the digital value differs from the reference value by at least a predetermined amount.

17. The device of claim 16, wherein the reference value is measured and stored in the digital comparator upon initialization of the device.

18. The device of claim 16, wherein the analog-to-digital converter detects the test voltage at a periodic rate.

19. The device of claim 16, wherein the current mirror is not one-to-one, wherein a transistor of said current mirror remains in saturation.

20. The device of claim 16, wherein the voltage generator comprises:
    a supply transistor connected to a power supply; and
    a voltage comparator configured to minimize a voltage difference between transistor ports of the supply transistor to maintain the constant supply voltage over variations in current through the external circuit.

21. A device comprising:
    means for maintaining a constant supply voltage at a port of the device independently of a state of a switch of an external circuit connected to the port;
    means for sensing a current of the external circuit;
    means for converting the sensed current to a digital value; and
    means for comparing the digital value to a reference value and for determining the switch has been actuated if the digital value differs from the reference value by at least a predetermined amount.

* * * * *